United States Patent
Monsonego et al.

(10) Patent No.: US 12,388,862 B1
(45) Date of Patent: Aug. 12, 2025

(54) CYBER THREAT REMEDIATION VIA POLICY VIOLATION CLUSTERING

(71) Applicant: Oasis Security Ltd., Tel Aviv (IL)

(72) Inventors: Jonathan Moshe Monsonego, Tel Aviv (IL); Noam Meerovitch, Raanana (IL); Yonit Glozshtein, Tel Aviv (IL); Roey Rozi, Tel Aviv (IL)

(73) Assignee: Oasis Security Ltd., Tel Aviv (IL)

( * ) Notice: Subject to any disclaimer, the term of this patent is extended or adjusted under 35 U.S.C. 154(b) by 99 days.

(21) Appl. No.: 18/436,853

(22) Filed: Feb. 8, 2024

(51) Int. Cl.
   *H04L 9/40* (2022.01)

(52) U.S. Cl.
   CPC ............. *H04L 63/1441* (2013.01)

(58) Field of Classification Search
   CPC .................................. H04L 63/1441
   See application file for complete search history.

(56) References Cited

U.S. PATENT DOCUMENTS

| | | | | |
|---|---|---|---|---|
| 7,734,652 | B2* | 6/2010 | Tamayo | G06F 16/283 |
| | | | | 707/600 |
| 8,185,481 | B2 | 5/2012 | Long et al. | |
| 8,356,086 | B2 | 1/2013 | Liu et al. | |
| 9,727,532 | B2 | 8/2017 | Perronnin et al. | |
| 10,599,700 | B2* | 3/2020 | Davulcu | G06F 40/247 |
| 12,346,362 | B2* | 7/2025 | Frikha | G06F 16/35 |
| 2016/0203316 | A1* | 7/2016 | Mace | G06F 21/316 |
| | | | | 726/23 |
| 2017/0116204 | A1* | 4/2017 | Davulcu | G06F 16/355 |
| 2017/0372071 | A1* | 12/2017 | Saxe | H04L 63/1416 |
| 2019/0005110 | A1* | 1/2019 | Povalyayev | G06F 16/285 |
| 2019/0138372 | A1* | 5/2019 | Tee | H04L 41/16 |
| 2019/0199731 | A1* | 6/2019 | Park | H04L 63/102 |
| 2019/0347282 | A1* | 11/2019 | Cai | G06N 5/022 |

(Continued)

FOREIGN PATENT DOCUMENTS

| | | |
|---|---|---|
| CN | 108416374 B | 7/2020 |
| CN | 113177588 A | 7/2021 |

(Continued)

OTHER PUBLICATIONS

Tang et al., New methods of Data Clustering and Classification based on NMF, 2011 International Conference on Business Computing and Global Informatization (Year: 2011).*

(Continued)

*Primary Examiner* — Hieu T Hoang
(74) *Attorney, Agent, or Firm* — M&B IP ANALYSTS, LLC (57) ABSTRACT

A system and method for clustering. A method includes creating a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources; clustering a plurality of keys of the plurality of key-value pairs based on the matrix in order to create a set of key clusters; and determining at least one computing resource cluster based on the set of key clusters, wherein each computing resource cluster includes a respective subset of the plurality of computing resources.

25 Claims, 5 Drawing Sheets

(56) References Cited

U.S. PATENT DOCUMENTS

2021/0117476 A1* 4/2021 Lee .................. G06F 16/906
2025/0133118 A1* 4/2025 Horesh ................ H04L 63/10

FOREIGN PATENT DOCUMENTS

CN          111933211 B    10/2023
WO       2015004421 A1    1/2015

OTHER PUBLICATIONS

Platos et al., Detecting Insider Attacks Using Non-negative Matrix Factorization, 2009 Fifth International Conference on Information Assurance and Security (Year: 2009).*

Touzene et al., Non-Negative Matrix Factorization Based Intrusion Detection System for IOT Traffic (Year: 2023).*

Lin et al., CANN: An intrusion detection system based on combining cluster centers and nearest neighbors (Year: 2015).*

A. Toscher; M. Jahrer (2008). "The BigChaos solution to the Netflix Prize 2008". Archived from the original on Feb. 16, 2012. Available via https://en.wikipedia.org/wiki/Netflix_Prize. Date accessed Feb. 1, 2024.

James Bennett; Stan Lanning (Aug. 12, 2007). "The Netflix Prize". Proceedings of KDD Cup and Workshop 2007. Archived from the original on Sep. 27, 2007. Available via https://en.wikipedia.org/wiki/Netflix_Prize. Date accessed Feb. 1, 2024.

* cited by examiner

CYBER THREAT REMEDIATION VIA POLICY VIOLATION CLUSTERING

TECHNICAL FIELD

The present disclosure relates generally to efficiently remediating cyber threats, and more particularly to remediating cyber threats by clustering policy violations with respect to resources.

BACKGROUND

Software engineering may utilize various computing resources in order to store data, realize code execution, communicate with other components, and more. Such resources may include physical or virtual components within a computer system. Examples of resources may include files, file systems, virtual machines, software containers, gateways, networking components, and the like.

In many computing environments, tags are utilized to characterize resources. Such tags may be assigned to resources in order to identify, classify, organize, filter, or manage resources. Tags are often realized as key-value pairs. For example, a key may indicate a general type of resource or relate the resource to a stage in software development, and the corresponding value may indicate a more specific type of resource or role the resource plays within a certain stage in software development. When used properly, tags can help users determine characteristics of a given resource which may be useful for managing the computing environment in which the resource is deployed.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for clustering. The method comprises: creating a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources; clustering a plurality of keys of the plurality of key-value pairs based on the matrix in order to create a set of key clusters; and determining at least one computing resource cluster based on the set of key clusters, wherein each computing resource cluster includes a respective subset of the plurality of computing resources.

Certain embodiments disclosed herein also include a non-transitory computer readable medium having stored thereon causing a processing circuitry to execute a process, the process comprising: creating a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources; clustering a plurality of keys of the plurality of key-value pairs based on the matrix in order to create a set of key clusters; and determining at least one computing resource cluster based on the set of key clusters, wherein each computing resource cluster includes a respective subset of the plurality of computing resources.

Certain embodiments disclosed herein also include a system for clustering. The system comprises: a processing circuitry; and a memory, the memory containing instructions that, when executed by the processing circuitry, configure the system to: create a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources; cluster a plurality of keys of the plurality of key-value pairs based on the matrix in order to create a set of key clusters; and determine at least one computing resource cluster based on the set of key clusters, wherein each computing resource cluster includes a respective subset of the plurality of computing resources.

Certain embodiments disclosed herein include the method, non-transitory computer readable medium, or system noted above or below, wherein the matrix lacks any negative elements.

Certain embodiments disclosed herein include the method, non-transitory computer readable medium, or system noted above or below, further including or being configured to perform the following step or steps: determining at least one policy violation cluster based on the at least one computing resource cluster.

Certain embodiments disclosed herein include the method, non-transitory computer readable medium, or system noted above or below, further including or being configured to perform the following step or steps: remediating at least one cyber threat based on the at least one policy violation cluster.

Certain embodiments disclosed herein include the method, non-transitory computer readable medium, or system noted above or below, further including or being configured to perform the following step or steps: applying at least one remedial action across policy violations within each policy violation cluster.

Certain embodiments disclosed herein include the method, non-transitory computer readable medium, or system noted above or below, further including or being configured to perform the following step or steps: performing at least one remedial action as a batch action across multiple computing resources of the plurality of computing resources based on the at least one policy violation cluster and the at least one computing resource cluster.

Certain embodiments disclosed herein include the method, non-transitory computer readable medium, or system noted above or below, wherein the matrix includes a plurality of elements, each element corresponding to a respective combination including a distinct key from the plurality of distinct keys and a distinct value from the plurality of distinct values, wherein each element of the plurality of elements indicates whether the respective combination of distinct key and distinct value exists in the dataset.

Certain embodiments disclosed herein include the method, non-transitory computer readable medium, or system noted above or below, further including or being configured to perform the following step or steps: factorizing the matrix into first and second factorized matrices, wherein clustering the plurality of keys of the plurality of key-value pairs further includes applying a clustering algorithm to keys represented in the matrix according to feature vectors of the keys represented in the matrix from the first and second factorized matrices.

Certain embodiments disclosed herein include the method, non-transitory computer readable medium, or system noted above or below, wherein the matrix lacks any negative elements, wherein the matrix is factorized using non-negative matrix factorization, wherein each of the first and second factorized matrix lacks any negative elements.

Certain embodiments disclosed herein include the method, non-transitory computer readable medium, or system noted above or below, further including or being configured to perform the following step or steps: iteratively clustering the plurality of keys into a plurality of optimized key clusters in order to optimize similarity scores for the plurality of key clusters, wherein the at least one computing resource cluster is determined based further on the plurality of optimized key clusters.

Certain embodiments disclosed herein include the method, non-transitory computer readable medium, or system noted above or below, further including or being configured to perform the following step or steps: filtering at least one key-value pair from among the plurality of key-value pairs, wherein each filtered key-value pair occurs among the plurality of key-value pairs at most a threshold number of times.

Certain embodiments disclosed herein include the method, non-transitory computer readable medium, or system noted above or below, further including or being configured to perform the following step or steps: filtering at least one key-value pair from among the plurality of key-value pairs, wherein each filtered key-value pair has a Boolean value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include techniques for efficiently mitigating cyber threats via clustering policy violations. In an embodiment, a first set "N" having size n and a second set "M" having size m (where each of n and m is an integer having a value of 2 or greater) are created based on a dataset including resource tags of respective resources. Specifically, the resource tags may include, but are not limited to, key-value pairs, with each resource tag having a respective key and a respective value making up its respective key-value pair. The first set N contains all of the unique keys in the dataset (i.e., each distinct key appearing in the dataset), and the second set M contains all of the unique values in the dataset (i.e., each distinct value appearing in the dataset).

In some embodiments, key-value pairs are filtered in order to clean the dataset for more accurate clustering. More specifically, key-value pairs which occur rarely in the dataset (e.g., below a threshold number or proportion of instances), key-value pairs having Boolean values, or both, may be filtered. Rarely occurring values have little statistical significance and can therefore hinder the ability to effectively cluster the resource tags. Resource tags having Boolean values offer little information for clustering purposes and may therefore increase the number of false positives or negatives in terms of clustering. Thus, filtering resource tags meeting either of these requirements may improve accurately clustering similar resources.

A matrix is created using the first and second sets. Specifically, the matrix may be realized as a n by m matrix with values each representing whether a given key-value pair exists in the dataset. For example, a matrix V may be assigned values such that $V_{ij}=1$ (where i and j are both integers having values between 1 and n or m, respectively) if a resource tag with key N[i] and value M[j] occur in the dataset; otherwise, $V_{ij}=0$. The matrix is factorized into first and second factorized matrices using Non-Negative Matrix Factorization.

One or more clustering algorithms such as k-means clustering are applied to keys of the matrix according to their feature vectors from the factorized matrices in order to cluster the keys (and, consequently, their respective kay-value pairs). The process may be iterated in order to optimize similarity scores such as silhouette scores for the clusters, thereby optimizing the clusters. Once the clusters have been created and optionally optimized, the clusters may be used to determine groupings of respective policy violations such that policy violations associated with resources in the same resource cluster are grouped into the same policy violation cluster.

In this regard, it is noted that cybersecurity for computing environments such as cloud environments often involves policy violations related to specific computing resources (e.g., cloud resources). It has been identified that, by identifying and grouping similar computing resources, these similarities can also be applied to policy violations in order to effectively identify where remedial actions can be performed more efficiently. In other words, policy violations related to similar computing resources can be grouped together, and remedial actions may be applied across such groups in order to remediate faster and using fewer computing resources than remediating each violation separately. The techniques disclosed in this application allow for improving efficiency of remediating cyber threats via grouping of policy violations.

It is also noted that similarity of computing resources can be subjective, and different users may arrive at different conclusions regarding similarity. As a result, attempts to manually group policy violations based on resource similarity would be highly subjective and prone to human error. Moreover, what is considered similar may vary across different organizations.

To this end, it has been identified that resource tagging systems such as those offered by many existing cloud providers may be leveraged in order to objectively define similarity, thereby allowing for objectively and automatically grouping resources and, consequently, to group their respective policy violations. Such resource tags may be realized as free-form text pairs including a key and a value.

It has further been identified that, although resource tags could be grouped based on simple matching (i.e., grouping resources with the same key-value pair), such a naïve approach would result in failure to effectively group resources which are actually highly similar for cybersecurity purposes. In this regard, it is noted that these resource tags are typically created manually by users. As a result, subjective human judgments (which keys and values to use) as well as human error (typos) can cause similar resources to have different resource tags. For example, one user may decide to tag a given resource with {"env": "prod"} and another user may decide to tag a highly similar resource with {"purpose": "production"}.

The disclosed embodiments leverage non-negative matrix factorization techniques in order to realize clustering of resource tags despite differences in expression of their respective keys and values. Accordingly, the disclosed embodiments allow for objectively, accurately, and automatically clustering such resource tags and the policy violations of their corresponding resources, which in turn allows for applying remedial actions across clusters of policy violations in order to more efficiently and quickly remediate potential cyber threats. To this end, the disclosed embodiments convert key-value resource tag pairs into 2-dimensional matrices, which enables applying non-negative matrix factorization to the resource tags in order to realize clustering based on similarity in an objective, accurate manner.

Figure 1:
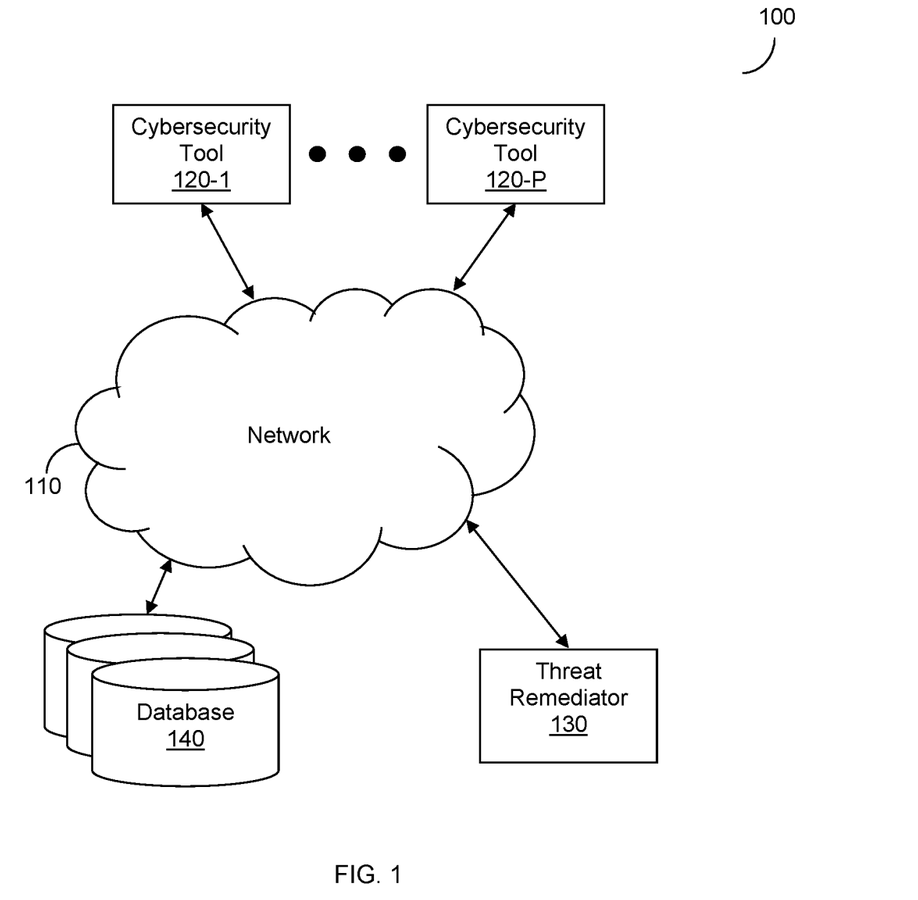
FIG. 1 is a network diagram utilized to describe the various disclosed embodiments.

FIG. 1 shows an example network diagram 100 utilized to describe the various disclosed embodiments. In the example network diagram 100, a plurality of cybersecurity tools 120-1 through 120-P (hereinafter referred to individually as a cybersecurity tool 120 and collectively as cybersecurity tools 120, merely for simplicity purposes), a threat remediator 130, and a database 140 communicate via a network 110. The network 110 may be, but is not limited to, a wireless, cellular or wired network, a local area network (LAN), a wide area network (WAN), a metro area network (MAN), the Internet), the worldwide web (WWW), similar networks, and any combination thereof.

The cybersecurity tools 120 may include, but are not limited to, scanners or other cybersecurity tools configured to alert upon potential cyber threats. More specifically, as discussed herein, the cybersecurity tools 120 may apply security policies and detect violations of those policies. The cybersecurity tools 120 provide policy violations via policy violation data in forms such as notifications, reports, messages, or other data indicating circumstances related to the violation of the policy. In accordance with various disclosed embodiments, resources involved in violations of policies (e.g., resources that violated policies or were determined to be communicating with external systems that violated policies) are indicated in at least some of the policy violations and used for grouping the policy violations as discussed herein.

More specifically, in various disclosed embodiments, the threat remediator 130 is configured to group resources based on respective resource tags, and these groupings of resources are used to group corresponding policy violations (e.g., by grouping policy violations such that policy violations in the same policy violation group indicate respective resources within the same resource group). These groupings of policy violations may be utilized to remediate the policy violations more efficiently, for example, by performing remedial actions in batches with respect to these groups. As noted above, it has been identified that the kinds of characteristics often represented in resource tags of resources in computing environments tend to indicate how the resources are used within the environment such that securing resources that have similar characteristics can be performed more efficiently by grouping and remediating policy violations based on groupings of resources determined using these resource tags.

To this end, the threat remediator 130 may be configured to retrieve or otherwise obtain the resource tags, for example by accessing one or more databases 140. Such databases 140 may include data related to resources in a computing environment (not shown in FIG. 1) in which resources are deployed and which may need to be secured against potential cyber threats.

Figure 2:
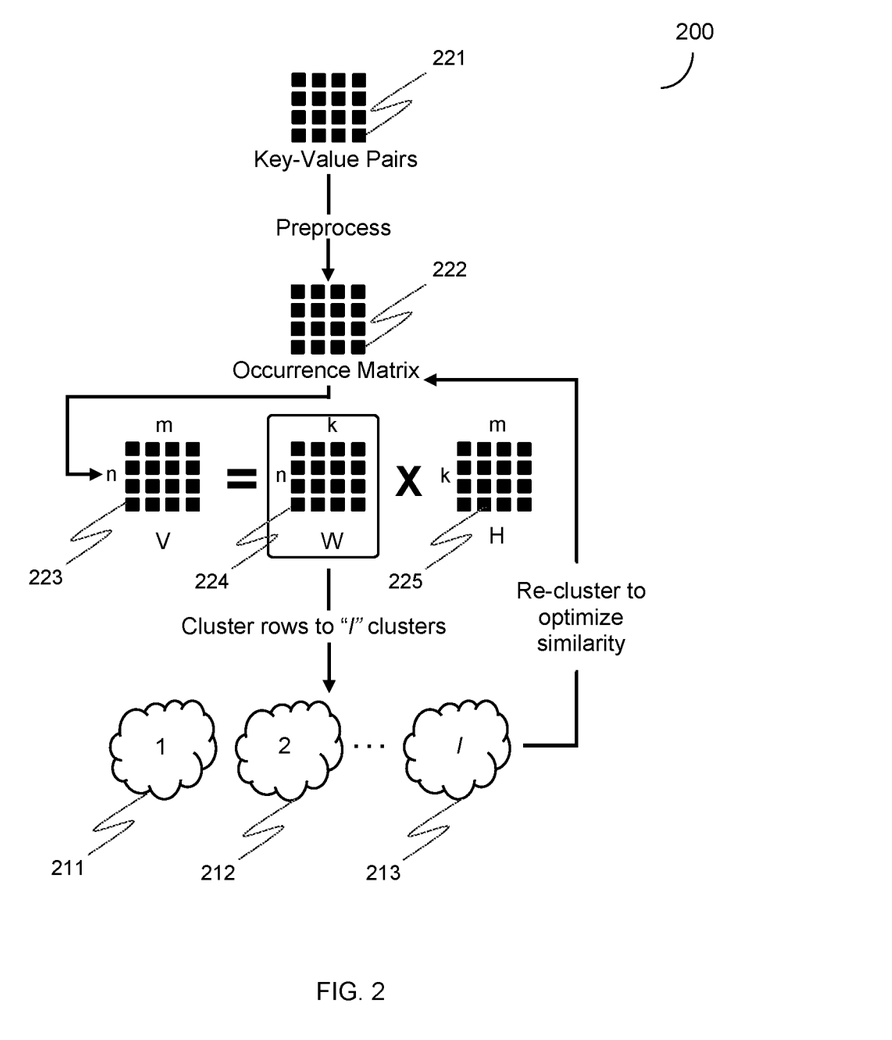
FIG. 2 is a flow diagram utilized to describe various disclosed embodiments.

FIG. 2 is an example flow diagram 200 utilized to describe the various disclosed embodiments. The example flow diagram 200 illustrates processing of resource tag data in order to perform non-negative matrix factorization which may be utilized for resource grouping as described herein.

As depicted in FIG. 2, a set of key-value pairs 221 are preprocessed and utilized to generate an occurrence matrix 222 with elements representing keys and values among the key-value pairs 221. The preprocessing may include, but is not limited to, cleaning the dataset including the key-value pairs 221. For example, the dataset may be cleaned by removing key-value pairs among the set of key-value pairs 221 that occur rarely in the dataset (e.g., below a threshold number or proportion of times), removing key-value pairs whose values are Boolean values, both, and the like.

The occurrence matrix 222 may include, for example, a set of elements indicating respective key-value combinations and may indicate, for example, a number of occurrences of each key-value combination. The occurrence matrix 222 is utilized to create a non-negative matrix ("V") 223, where the non-negative matrix 223 is an n by m matrix (with n and m each being an integer having a value of 1 or greater). More specifically, in an embodiment, the non-negative matrix 223 includes various elements organized into a number n of rows corresponding to the number of distinct keys appearing among the key-value pairs 221 and a number m of columns corresponding to the number of distinct values among the key-value pairs 221. In other words, each key and each value represented in the non-negative matrix 223 is represented only once in the non-negative matrix 223 (e.g., as a single row or column, respectively) such that the non-negative matrix 223 effectively represents all potential key and value combinations based on keys and values observed among the key-value pairs 221.

That is, in such an embodiment, each element of the non-negative matrix 223 corresponds to a combination of a distinct key and a distinct value such that each element represents a potential key-value pair defined with respect to known keys and values for the dataset. In an embodiment, each element in the non-negative matrix 223 has a value greater than or equal to 0 (i.e., a non-negative value). In a further embodiment, each element in the non-negative matrix 223 corresponds to a respective has a value of 0 or 1, with a given element having a value of 0 when the key-value combination represented by that element does not appear anywhere among the key-value pairs 221, and a given element having a value of 1 when the key-value combination represented by that element appears at least once among the key-value pairs 221. In other words, values may be assigned to the non-negative matrix 223 called "V" such that $V_{ij}=1$ if a resource tag with key N[i] and value M[j] occurs among the key-value 221, and $V_{ij}=0$ otherwise.

The non-negative matrix 223 is factorized during a matrix factorization process into factorized matrices 224 and 225 ("W" and "H"). Like the non-negative matrix 223, the factorized matrices 224 and 225 also lack any negative elements. A first factorized matrix 224 is a n by k matrix and a second factorized matrix 225 is a k by m matrix, where k is the number of latent features of the dataset including the key-value pairs 221. In an embodiment, the latent features of that dataset are computed based on observed features (e.g., features included among the key-value pairs 221) during matrix factorization. In other words, each latent feature is a key-value pair which does not actually appear in the dataset but includes both a key and a value which do appear in the dataset.

In a further embodiment, W (first factorized matrix 224) and H (second factorized matrix 225) are created such that V (non-negative matrix 223) is approximately equal to the dot product of W and H (V≈W·H). Approximately equal may mean, for example, within a predetermined threshold distance (e.g., based on a distance calculated between V and the dot product W·H).

The keys of the non-negative matrix 223 are clustered using a clustering algorithm such as k-means clustering according to their respective feature vectors from the first factorized matrix 224, resulting in a number I of clusters (where I is an integer having a value equal to or greater than 2). Each of the I clusters has k numeric features.

In some embodiments, the clustering process may be iteratively performed by changing the values of k and/and re-clustering the keys. Such iterative clustering may be performed until the average similarity score (e.g., silhouette score) for the clusters are maximized or otherwise in order to optimize similarity scores among the clusters. The clusters may be utilized to group resources and, consequently, their respective policy violations as discussed herein.

Figure 3:
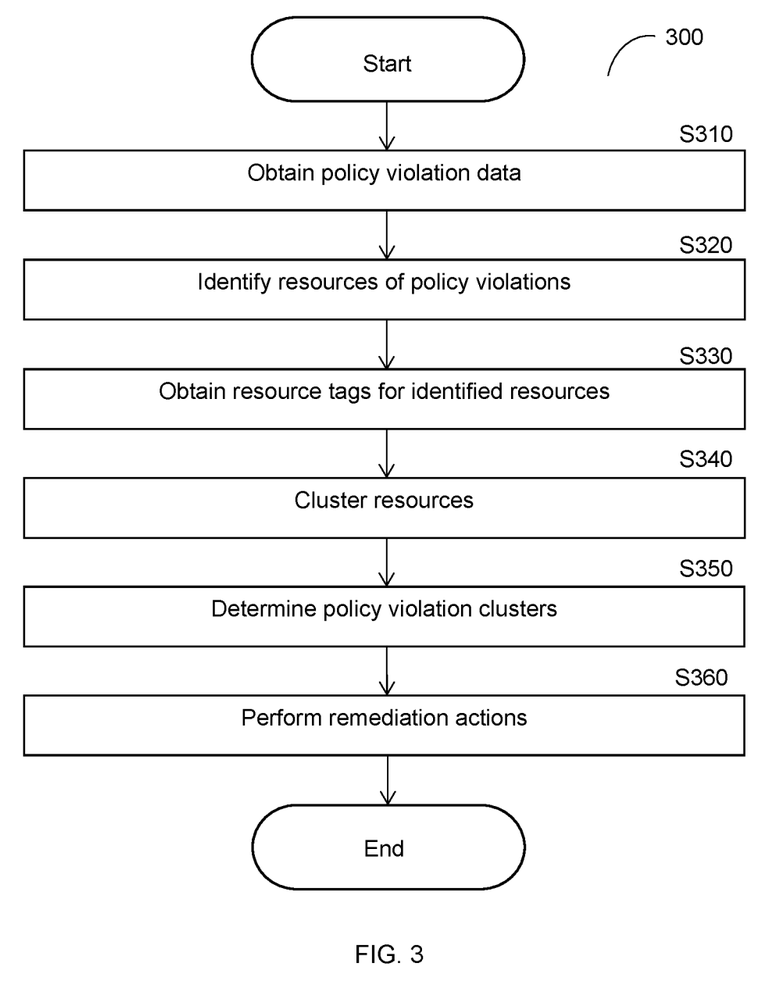
FIG. 3 is a flowchart illustrating a method for remediating cyber threats using policy violation clustering according to an embodiment.

FIG. 3 is an example flowchart 300 illustrating a method for remediating cyber threats using policy violation clustering according to an embodiment. In an embodiment, the method may be performed by the threat remediator 130, FIG. 1.

At S310, policy violation data is obtained. The policy violation data may be or may include, but is not limited to, policy violations detected by one or more cybersecurity tools (e.g., the cybersecurity tools 120, FIG. 1) which are configured to alert on violations of cybersecurity or other policies with respect to resources which triggered or were otherwise involved in policy violations. In accordance with various disclosed embodiments, the policy violation data includes at least some policy violations which indicate resources (i.e., computing resources such as cloud resources) involved in the policy violations such that the policy violations may be grouped by grouping their respective resources.

At S320, resources indicated among the policy violations are identified. The identified resources include resources having respective resource tags such that identifying the resources may allow for retrieving their respective resource tags.

At S330, resource tags for the identified resources are obtained. In an embodiment, S330 includes accessing one or more databases (e.g., the databases 140, FIG. 1) storing metadata related to resources deployed in one or more computing environments in order to retrieve the respective resource tags for the identified resources.

In an embodiment, each resource tag includes a key and a value forming a key-value pair. The obtained resource tags may be user-defined or otherwise created based on inputs from users such that the keys and values themselves, or the combinations of keys and values, may be expressed differently by different users. In this regard, it is noted that resource tags are often realized as free-form text pairs which are entered manually by users of a computing environment (e.g., an owner of a resource may provide the text for its resource tag). Consequently, these text pairs may vary between users within the same organization, or may vary between organizations.

As a non-limiting example, one organization may have standards for key-value pairs that define how the tags should be expressed, while another organization has a different set of standards, thereby resulting in different expressions of key-value pairs created by users in the different organizations for instances of the same resource deployed in the different organizations' computing environments. As another non-limiting example, resources among the same stage (production) of the software engineering lifecycle may be desirable to represent using the same key-value pair, but instead different inputs from different users may result in key-value pairs for different resources including {"Environment":"Production"}, {"Env":"Prod"}, and {"Env":"Production"}. As noted above, naively matching these key-value pairs would result in the resources being incorrectly identified as dissimilar.

At S340, the resources are clustered with respect to their respective resource tags. In an embodiment, S340 includes performing non-negative matrix factorization and clustering the resource tags using factorized matrices representing features among the key-value pairs. As noted above, it has been identified that non-negative matrix factorization may be leveraged in order to accurately and objectively analyze similarities between key-value pairs which, in turn, may allow for grouping together resources having key-value pairs determined to be similar.

In a further embodiment, one or more clustering algorithms such as k-means clustering are applied to the keys to their feature vectors from the factorized matrices in order to cluster the keys (and, consequently, their respective key-value pairs). In yet a further embodiment, the process may be iterated in order to optimize the degree of similarity (e.g., by maximizing or otherwise optimizing similarity scores for the clusters), thereby optimizing the clusters.

In this regard, it is noted that a human could cluster resource tags. However, manual clustering of resource tags would necessarily require subjective judgments about which keys, values, or combinations of keys and values "seem" similar enough to effectively represent similar resources (e.g., resources which play the same role in the software engineering lifecycle). Moreover, any manual clustering would introduce possibilities of human error (e.g., mistakenly identifying keys or values which have minute differences as being the same, thereby leading to mistakenly identifying key-value pairs as matching when they represent very different resources). By representing the key-value pairs as matrices and leveraging non-negative matrix factorization, the resource tags may be clustered in a manner which avoids the need for manual grouping and provides a consistent, accurate process for clustering resource tags that accounts for potential differences between otherwise similar key-value pairs.

An example process which may be utilized to cluster resource tags is described in further detail below with respect to FIG. 4.

At S350, policy violation clusters are determined based on the resource clusters determined at S340. In an embodiment, the policy violations are clustered or otherwise grouped such that policy violations belonging to the same cluster or group correspond to respective resources which belong to the same cluster. As noted above, policy violations which are clustered together may be remediated more efficiently, for example, by performing batch actions that act upon multiple resources at once (e.g., multiple resources corresponding to policy violations within the same policy violation cluster). Accordingly, remediating policy violations based on policy violation clusters allows for conserving computing resources when performing remediation actions as well as for reducing the amount of time needed to remediate cyber threats which impact similar resources within a computing environment.

At S360, one or more remediation actions are performed based on the policy violation clusters. In an embodiment, at least some of the remediation actions may be applied across clustered policy violations so as to remediate faster and using fewer computing resources as compared to remediating each policy violation separately. To this end, remediation actions may be batched with respect to the clusters or otherwise performed so as to act upon multiple resources together in order to remediate the policy violations affecting or triggered by those resources.

Figure 4:
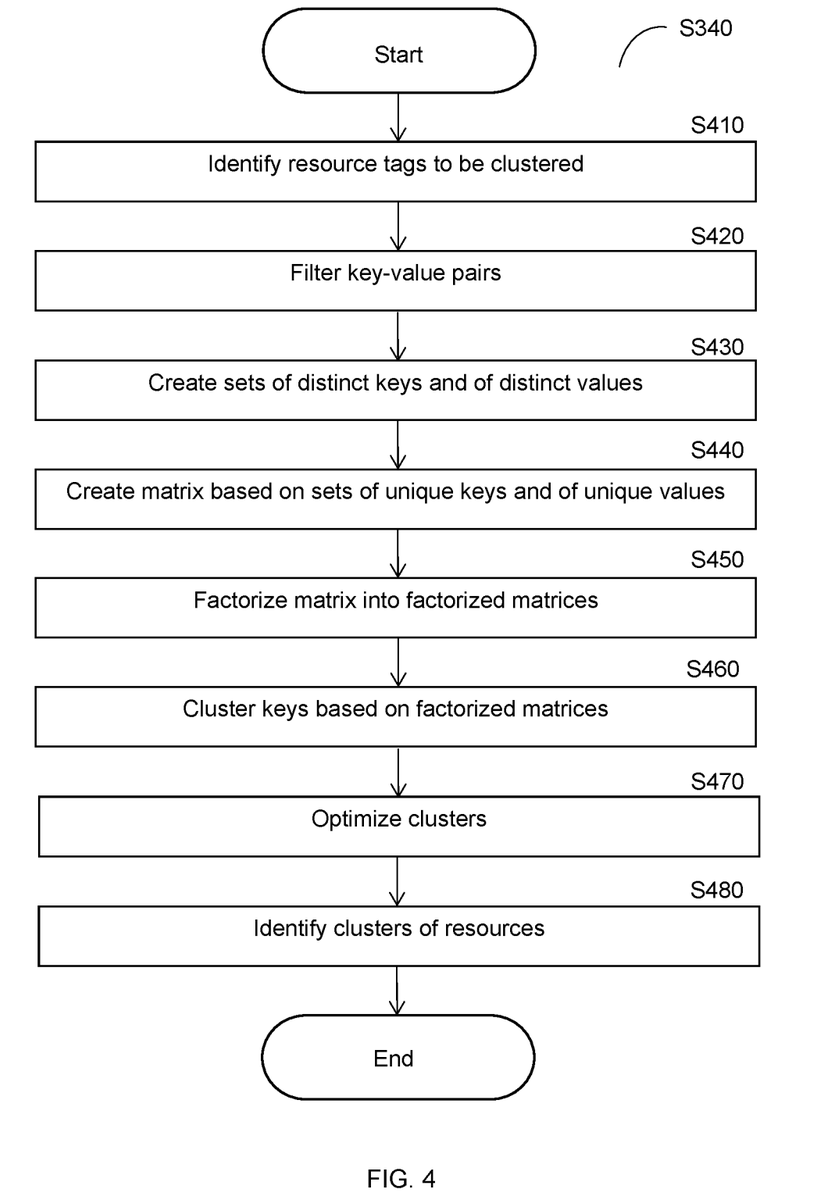
FIG. 4 is a flowchart illustrating a method for policy violation clustering according to an embodiment.

FIG. 4 is an example flowchart S340 illustrating a method for policy violation clustering according to an embodiment.

At S410, resource tags to be clustered are identified. In an embodiment, the resource tags to be clustered are resource tags belonging to resources indicated among policy violations to be clustered. The identified resource tags each include a key-value pair having a key and a corresponding value. The key-value pair for each resource represents one or more characteristics of the resource such as, but not limited to, its role within the computing environment (e.g., roles as defined with respect to stages of the software development lifecycle).

At optional S420, key-value pairs among the resource tags may be filtered in order to clean the dataset to allow for more accurate clustering. To this end, S420 may include, but is not limited to, filtering key-value pairs which occur rarely in the data set (e.g., below a threshold number or proportion of occurrences among the key-value pairs), key-value pairs having Boolean values, both, and the like. In this regard, it has been identified that rarely occurring values have little statistical significance and can hinder the ability to effectively cluster resource tags. Likewise, it has been identified that Boolean values offer little information for purposes of clustering key-value pairs of resource tags and may increase the number of false positives and false negatives with regards to clustering. Accordingly, filtering rarely occurring key-value pairs and/or key-value pairs whose values are Boolean data type allows for improving accuracy of subsequent clustering as well as reducing the total amount of key-value pairs to be analyzed and clustered (thereby conserving computing resources).

At S430, sets of distinct keys and of distinct values are created. In an embodiment, a first set (i.e., "N") is created which contains all of the unique keys in the dataset, and a second set (i.e., "M") is created which contains all of the unique values in the dataset. Each distinct key or distinct value is a key or value, respectively, which appears among the key-value pairs and is represented in the respective set N or M once, i.e., such that a distinct key or distinct value is unique in that no distinct key is the same as any other distinct key and no distinct value is the same as any other distinct value.

At S440, a matrix is created based on the sets of distinct keys and values. In an embodiment, the matrix is realized as an n by m matrix with elements each representing whether a given key-value pair exists in the dataset, where n is a number of distinct keys in the set N and m is the number of distinct values in the set M. In a further embodiment, the matrix is a non-negative matrix in which none of the elements in the matrix are negative values (i.e., the non-negative matrix lacks any negative elements). As a non-limiting example, a matrix V may be assigned values such that $V_{ij}=1$ if a resource tag with key N[i] and value M[j] occurs among the key-value 221, and $V_{ij}=0$ otherwise.

At S450, the matrix is factorized in order to create a set of factorized matrices. In an embodiment, the matrix is factorized using non-negative matrix factorization in order to produce first and second factorized matrices, where each factorized matrix is also a non-negative matrix lacking any negative value elements.

In a further embodiment, W (a first factorized matrix) and H (a second factorized matrix) are created such that V (the matrix created at S440) is approximately equal to (e.g., within a predetermined threshold distance of) the dot product of W and H ($V \approx W \cdot H$). In yet a further embodiment, the first factorized matrix W is a n by k matrix and the second factorized matrix H is a k by m matrix, where k is the number of latent features of the key-value pairs. Such latent features are features which are hidden in the original dataset (i.e., not explicitly included among the original dataset) and are computed based on the observed features during the matrix factorization. The value of k may initially be set to a predetermined value and then iteratively modified in order to optimize cluster similarities. In an embodiment, the first factorized matrix W is realized as a list of n rows, one row per key, where each row has k numeric features.

At S460, one or more clustering algorithms are applied in order to cluster keys of the matrix created at S440 into a set of key clusters. In an embodiment, the clustering algorithm may be or may include a k-means clustering algorithm. In a further embodiment, the keys of the non-negative matrix are clustered according to their respective feature vectors from the first factorized matrix W in order to create a set of I clusters such that each of the I clusters has k numeric features. In some embodiments, the number of clusters I to be created may be initially set to a predetermined value. During subsequent iterations, the number of clusters I may be modified in order to optimize the clusters.

At optional S470, the key clusters are optimized. In an embodiment, optimizing the clusters includes iterating the clustering process while changing one or more parameters (e.g., the number of latent features k, the number of clusters I, both, etc.) until the average similarity score across clusters is maximized or otherwise until the similarity scores for the clusters meet certain predetermined similarity optimization criteria.

At S480, resource clusters are identified based on the key clusters. In an embodiment, resources are clustered such that resources whose key-value pairs include clustered keys are clustered together.

Figure 5:
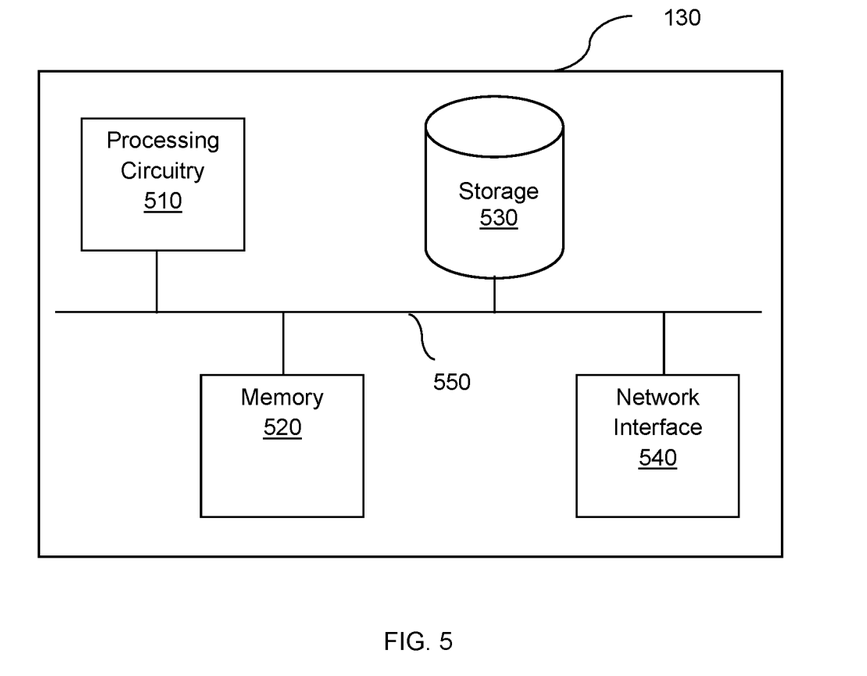
FIG. 5 is a schematic diagram of a threat remediator according to an embodiment.

FIG. 5 is an example schematic diagram of a threat remediator 130 according to an embodiment. The threat remediator 130 includes a processing circuitry 510 coupled to a memory 520, a storage 530, and a network interface 540. In an embodiment, the components of the threat remediator 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the threat remediator 130 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for clustering, comprising:
 creating a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources;
 clustering a plurality of keys of the plurality of key-value pairs based on the matrix in order to create a set of key clusters; and
 determining at least one computing resource cluster based on the set of key clusters, wherein each computing resource cluster includes a respective subset of the plurality of computing resources.

2. The method of claim 1, wherein the matrix lacks any negative elements.

3. The method of claim 1, further comprising:
 determining at least one policy violation cluster based on the at least one computing resource cluster.

4. The method of claim 3, further comprising:
remediating at least one cyber threat based on the at least one policy violation cluster.

5. The method of claim 4, further comprising:
applying at least one remedial action across policy violations within each policy violation cluster.

6. The method of claim 4, further comprising:
performing at least one remedial action as a batch action across multiple computing resources of the plurality of computing resources based on the at least one policy violation cluster and the at least one computing resource cluster.

7. The method of claim 1, wherein the matrix includes a plurality of elements, each element corresponding to a respective combination including a distinct key from the plurality of distinct keys and a distinct value from the plurality of distinct values, wherein each element of the plurality of elements indicates whether the respective combination of distinct key and distinct value exists among the plurality of key-value pairs.

8. The method of claim 1, further comprising:
factorizing the matrix into first and second factorized matrices, wherein clustering the plurality of keys of the plurality of key-value pairs further includes applying a clustering algorithm to keys represented in the matrix according to feature vectors of the keys represented in the matrix from the first and second factorized matrices.

9. The method of claim 8, wherein the matrix lacks any negative elements, wherein the matrix is factorized using non-negative matrix factorization, wherein each of the first and second factorized matrix lacks any negative elements.

10. The method of claim 1, further comprising:
iteratively clustering the plurality of keys into a plurality of optimized key clusters in order to optimize similarity scores for the plurality of key clusters, wherein the at least one computing resource cluster is determined based further on the plurality of optimized key clusters.

11. The method of claim 1, further comprising:
filtering at least one key-value pair from among the plurality of key-value pairs, wherein each filtered key-value pair occurs among the plurality of key-value pairs at most a threshold number of times.

12. The method of claim 1, further comprising:
filtering at least one key-value pair from among the plurality of key-value pairs, wherein each filtered key-value pair has a Boolean value.

13. A non-transitory computer readable medium having stored thereon instructions for causing a processing circuitry to perform a process, the process comprising:
creating a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources;
clustering a plurality of keys of the plurality of key-value pairs based on the matrix in order to create a set of key clusters; and
determining at least one computing resource cluster based on the set of key clusters, wherein each computing resource cluster includes a respective subset of the plurality of computing resources.

14. A system for decentralized storage and distribution of reduced data records, comprising:
a processing circuitry; and
a memory, the memory containing instructions that, when executed by the processing circuitry, configure the system to:
create a matrix based on a first set and a second set, wherein the first set includes a plurality of distinct keys, wherein the second set includes a plurality of distinct values, wherein each distinct key is a key among a plurality of key-value pairs corresponding to a plurality of resources, wherein each distinct value is a value among the plurality of key-value pairs corresponding to the plurality of computing resources;
cluster a plurality of keys of the plurality of key-value pairs based on the matrix in order to create a set of key clusters; and
determine at least one computing resource cluster based on the set of key clusters, wherein each computing resource cluster includes a respective subset of the plurality of computing resources.

15. The system of claim 14, wherein the matrix lacks any negative elements.

16. The system of claim 14, wherein the system is further configured to:
determine at least one policy violation cluster based on the at least one computing resource cluster.

17. The system of claim 16, wherein the system is further configured to:
remediate at least one cyber threat based on the at least one policy violation cluster.

18. The system of claim 17, wherein the system is further configured to:
apply at least one remedial action across policy violations within each policy violation cluster.

19. The system of claim 17, wherein the system is further configured to:
perform at least one remedial action as a batch action across multiple computing resources of the plurality of computing resources based on the at least one policy violation cluster and the at least one computing resource cluster.

20. The system of claim 14, wherein the matrix includes a plurality of elements, each element corresponding to a respective combination including a distinct key from the plurality of distinct keys and a distinct value from the plurality of distinct values, wherein each element of the plurality of elements indicates whether the respective combination of distinct key and distinct value exists among the plurality of key-value pairs.

21. The system of claim 14, wherein the system is further configured to:
factorize the matrix into first and second factorized matrices, wherein clustering the plurality of keys of the plurality of key-value pairs further includes applying a clustering algorithm to keys represented in the matrix according to feature vectors of the keys represented in the matrix from the first and second factorized matrices.

22. The system of claim 21, wherein the matrix lacks any negative elements, wherein the matrix is factorized using non-negative matrix factorization, wherein each of the first and second factorized matrix lacks any negative elements.

23. The system of claim 14, wherein the system is further configured to:
iteratively cluster the plurality of keys into a plurality of optimized key clusters in order to optimize similarity scores for the plurality of key clusters, wherein the at least one computing resource cluster is determined based further on the plurality of optimized key clusters.

24. The system of claim 14, wherein the system is further configured to:
    filter at least one key-value pair from among the plurality of key-value pairs, wherein each filtered key-value pair occurs among the plurality of key-value pairs at most a threshold number of times.

25. The system of claim 14, wherein the system is further configured to:
    filter at least one key-value pair from among the plurality of key-value pairs, wherein each filtered key-value pair has a Boolean value.

\* \* \* \* \*